(12) United States Patent
Liu

(10) Patent No.: US 7,860,271 B2
(45) Date of Patent: Dec. 28, 2010

(54) PORTABLE IMAGE MONITORING AND IDENTIFYING DEVICE

(75) Inventor: Chia-Lun Liu, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 1004 days.

(21) Appl. No.: 11/514,836

(22) Filed: Sep. 5, 2006

(65) Prior Publication Data

US 2008/0074540 A1 Mar. 27, 2008

(51) Int. Cl.
*G06K 9/00* (2006.01)
*G08B 21/00* (2006.01)

(52) U.S. Cl. .................... 382/103; 382/143; 340/573.1; 340/541

(58) Field of Classification Search ................. 340/148, 340/438, 523, 541, 506, 539; 382/100, 104, 382/106, 107, 115, 190, 181, 224, 199; 348/143, 348/148

See application file for complete search history.

(56) References Cited

U.S. PATENT DOCUMENTS

| 5,559,496 | A * | 9/1996 | Dubats ................. 340/539.26 |
| 6,693,530 | B1 * | 2/2004 | Dowens et al. ............. 340/506 |
| 6,943,682 | B1 * | 9/2005 | Dowens et al. ............. 340/506 |
| 7,113,090 | B1 * | 9/2006 | Saylor et al. ........... 340/539.18 |
| 2004/0155781 | A1 * | 8/2004 | DeOme ................... 340/573.1 |
| 2006/0017565 | A1 * | 1/2006 | Addy .................... 340/539.14 |
| 2006/0190419 | A1 * | 8/2006 | Bunn et al. ..................... 706/2 |
| 2006/0250236 | A1 * | 11/2006 | Ackley et al. ............... 340/540 |
| 2008/0259161 | A1 * | 10/2008 | Hellman et al. ............. 348/148 |

FOREIGN PATENT DOCUMENTS

| TW | M258521 U | 3/2005 |
| TW | M271216 U | 7/2005 |
| TW | I242380 B | 10/2005 |
| TW | M290286 U | 5/2006 |

\* cited by examiner

*Primary Examiner*—Bhavesh M Mehta
*Assistant Examiner*—Tahmina Ansari
(74) *Attorney, Agent, or Firm*—Muncy, Geissler, Olds & Lowe, PLLC

(57) ABSTRACT

The present invention discloses a portable image monitoring and identifying device suitable for monitoring an activity in the image and/or identifying image contents and when an image activity and/or an identified image content triggers certain preset event, a command or trigger signal can be sent out for controlling other external devices to act and/or send out a message to the user. The portable device includes an image input unit for inputting an input video, a main processor unit for executing functions of processing image data, detecting activity and triggering event, a memory unit for storing an operation data of the main processor, an input port for connecting with an input device so as to support the necessary operation by the user, and a control output port for outputting the command or trigger signal described above so as to control other external devices connected to the control output port to act.

19 Claims, 7 Drawing Sheets

PORTABLE IMAGE MONITORING AND IDENTIFYING DEVICE

FIELD OF THE INVENTION

The present invention is related to an image monitoring and identifying device, and more particularly to a portable image monitoring and identifying device which possesses great mobility and is suitable for monitoring an activity of target and/or identifying contents of image.

BACKGROUND OF THE INVENTION

Technologies regarding using camera to capture digital images and then using image processing technology to perform comparison, identification or analysis thereof have already found in some published patents, for example, R.O.C patent No. M290286 "storage and application device based on object tracing identifying technology of image capture", R.O.C patent No. M258521 "auto-image captured monitoring system integrated device", R.O.C patent No. M271216 "electronic security device for monitoring", and R.O.C patent No. I242380 "digital image monitoring system for detecting movement of object".

Presently, the known movement detecting devices in the market, for the most part, are simple type products, that is to say, they only alarm as objects passing by so that the application scope thereof is quite narrow. Therefore, they only can be applied to specific purpose, especially professional use, and can not conform to other demands from general consumers. On the other hand, another type of products may own more complicated functions and should be assisted by software so that working with a PC is necessary, that means, a PC must be employed to install the software and connect with the peripheral devices or apparatuses (such as camera, monitor or alarm), and then, the functions of detecting moving objects, capturing images or identifying images which are relatively more complicated and advanced can be achieved. However, in opposite, this kind of product becomes lack of mobility.

SUMMARY OF THE INVENTION

The main object of the present invention is to provide a portable image monitoring and identifying device which has a small volume, is convenient for carrying and owns plentiful functions.

For achieving the purpose described above, the portable image monitoring and identifying device of the present invention integrates a main processor, a memory unit, an input port and a control output port for signal into a module unit which has a small volume and can be carried conveniently. Furthermore, the module unit also can be connected with external video source, such as camera, and even be integrated with other products having the image capturing function, such as photo mobile phone, so as to capture a monitored or identified image signal and to output a command or trigger signal through the control output port for controlling other external devices which are connected with this control output port to act. For example, when an image activity and/or an identified image content triggers certain preset event, the main processor may send out a command or trigger signal through the control output port for driving an ON/OFF element so as to control the other external devices to act and/or send out a message to the user.

In another embodiment of the present invention, a storage apparatus is further included for storing monitored pictures or recording the procedure of event.

In another embodiment of the present invention, a communication unit is further included which can be a wireless communication module adopting standard protocol, a wired communication module or the combination thereof, wherein the wireless communication module can adopt various kinds of protocols, such as 433 MHz module, Z-Wave, Zigbee, GSM, X-10, and the wired communication module can be an Ethernet module so that when a preset event is triggered, the activity of the target and/or the identified image contents can be transmitted to the user for notification.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DESCRIPTION OF THE PREFERRED EMBODIMENT

Figure 1:
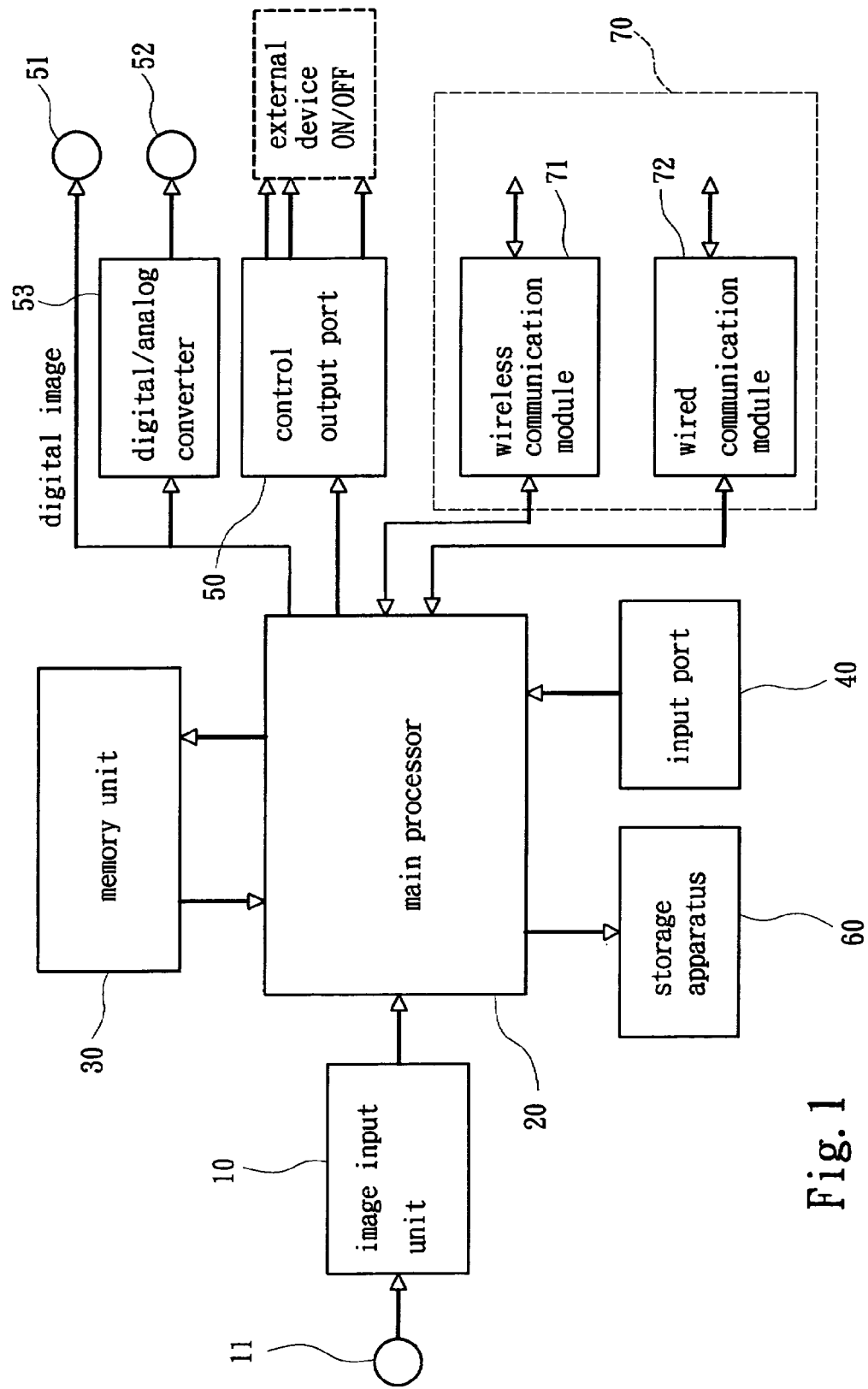
FIG. 1 is a block diagram showing a preferred embodiment of the present invention.

An embodiment according to the present invention, as shown in FIG. 1, includes:

an image input unit 10 having an image input terminal 11 capable of connecting with an external video source (which also contains an audio signal), such as monitoring camera, IP camera, image sensor, for example, CCD (Charge Coupled Device) or the likes, and other monitoring or playing devices, so as to capture inputted image signal or visual signal and then convert the obtained image signal into visual digital signal for outputting, wherein an A/D converter can be used to perform the analog/digital conversion;

a main processor 20 for processing the visual digital signal outputted by the image input unit 10 and executing the functions of: processing image data, detecting activity and triggering event, wherein according to an embodiment of the present invention, there already has different programs preset in the main processor 20 so that as the user select a "function mode" (which will be described in detail below), the main processor 20 may execute a corresponding program for starting monitoring image and/or identifying image contents and for sending out a command or trigger signal as the activity of image and/or the identified image contents trigger a preset event;

a memory unit 30 which can be a RAM for storing image data produced by the main processor 20 as operation and also for storing other data or the programs for further utilization;

an input port 40 for connecting with an input device (such as a mouse) so as to support the necessary operation by the user, for example, to set a monitoring area or perform other operation and setting on the screen through a mouse; and a control output port 50 for outputting the command or trigger signal from the main processor 20 so as to control the operation of external devices, which are connected to the control output port 50, for example, when the activity of the target and/or the identified image contents trigger a preset event, a command or trigger signal corresponding to this event can be outputted via the control output port 50 for driving a switch to control the ON/OFF of circuits so as to control the start/stop of other external devices, or an alarm signal will be outputted directly for driving the external devices, such as light illuminating element or speaker, to send out an audio/optical alarm signal.

According to another embodiment of the present invention, a digital image output terminal 51 and/or analog image output terminal 52 (a digital/analog converter 53 is employed to convert the described digital signal into analog signal) is further included for adding an user-interface signal into the processed and monitored digital and/or analog image signal and then outputting thereof to the external devices, such as video recorder, television, computer, or monitoring video recover so as to provide the user for monitoring or further utilization.

According to another embodiment of the present invention, a storage apparatus 60 is further included which can be a disc drive, DVR (Digital Video Recorder) or the likes, for storing monitored pictures or recording the procedure of event.

According to another embodiment of the present invention, a communication unit 70 is further included which includes a wireless communication module 71 adopting standard protocol, a wired communication module 72 or the combination thereof, wherein the wireless communication module can adopt various kinds of protocols, such as 433 MHz module, Z-Wave, Zigbee, GSM, X-10, and the wired communication module can be an Ethernet module so that when a present event is triggered, the activity of the target and/or the identified image contents can be transmitted to the user for notification.

According to the preferred embodiment of the present invention, the programs preload in the main processor 20 can provides several differential function modes:

1. Movement alarming mode: Through monitoring the image, once an activity is found, a signal is immediately outputted to the control output port 50 for driving the external device, such as light illuminating element or speaker, so as to send out an audio/optical alarming signal.

2. Anti burglary mode: A preset monitoring area is monitored so that when the image of the monitored area has any change, a signal is outputted to the control output port 50 for driving the external device, such as light illuminating element or speaker, so as to send out an audio/optical alarming signal.

3. Incursion mode: The moving area and a preset monitoring area are monitored so that when the two areas are overlapped or contacted, a signal is outputted to the control output port 50 for driving the external device, such as light illuminating element or speaker, so as to send out an audio/optical alarming signal.

4. Time counting mode: The time the moving area stayed at a same location is counted and if a preset time period is achieved, a signal is outputted to the control output port 50 for driving the external device, such as light illuminating element or speaker, so as to send out an audio/optical alarming signal.

5. Direction detecting mode: A preset moving direction is set and compared with the moving direction of the moving area, and if the two moving directions are different, a signal is outputted to the control output port 50 for sending out an alarm.

Basically, through the design of the program, the portable image monitoring and identifying device disclosed in the present invention can executing at least one of the function modes describe above at the same time.

Figure 2:
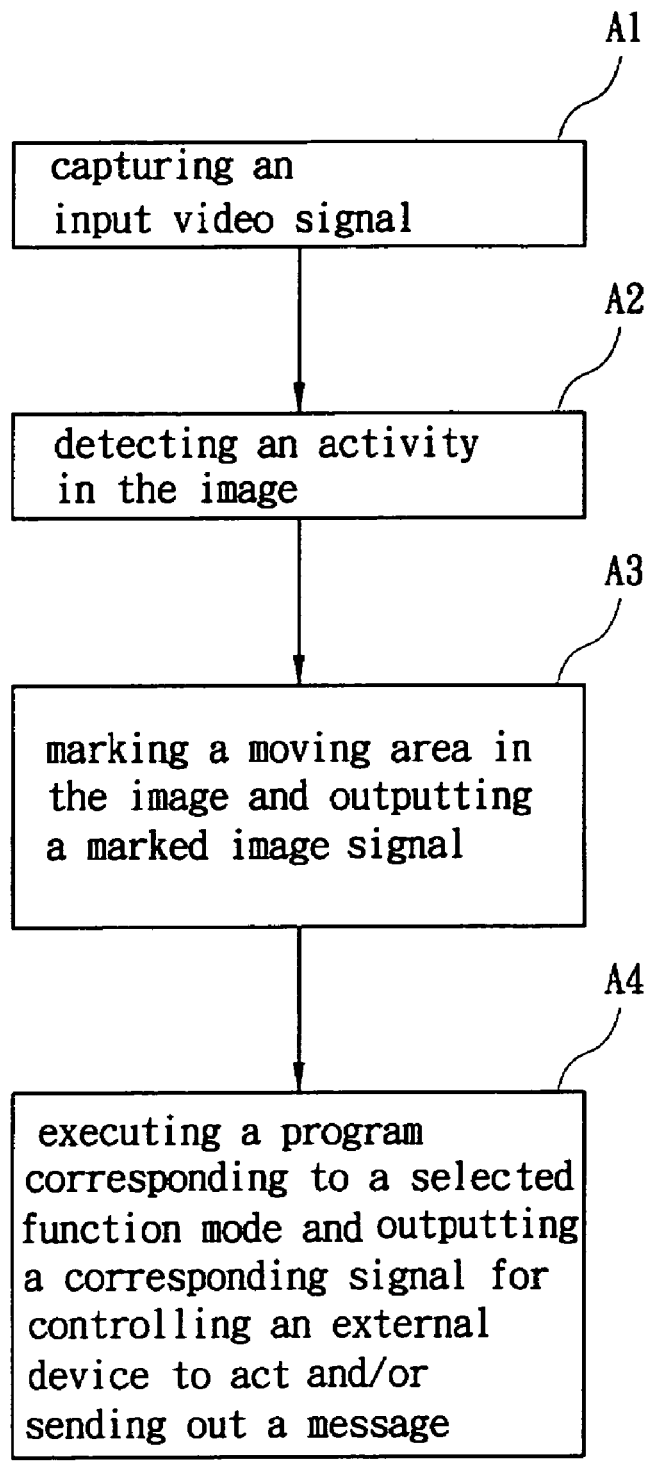
FIG. 2 is a flowing chart of a preferred embodiment of the present invention.

Please refer to FIG. 2 which is a flowing chart of the preferred embodiment of the present invention, including steps of:

A1. capturing an input video signal and converting the captured image into a digital image signal;

A2. detecting an activity in the image;

A3. marking a moving area in the image and outputting a marked image signal, and also displaying the monitored input video to the user through a display device if needed; and A4. executing a program corresponding to the function mode selected by the user or triggering a corresponding event and outputting a corresponding signal for controlling the operation of an external device and/or sending out a message to inform the user.

In step A4, the message sent to the user can be transmitted to user through the wireless communication module 71, the wired communication module 72 or the combination thereof of the communication unit 70. Of course, the user also can utilize the communication unit 70 to transmit back a control signal or control command for executing the command from the user through the main processor 20 so as to achieve a remote control function.

Figure 3:
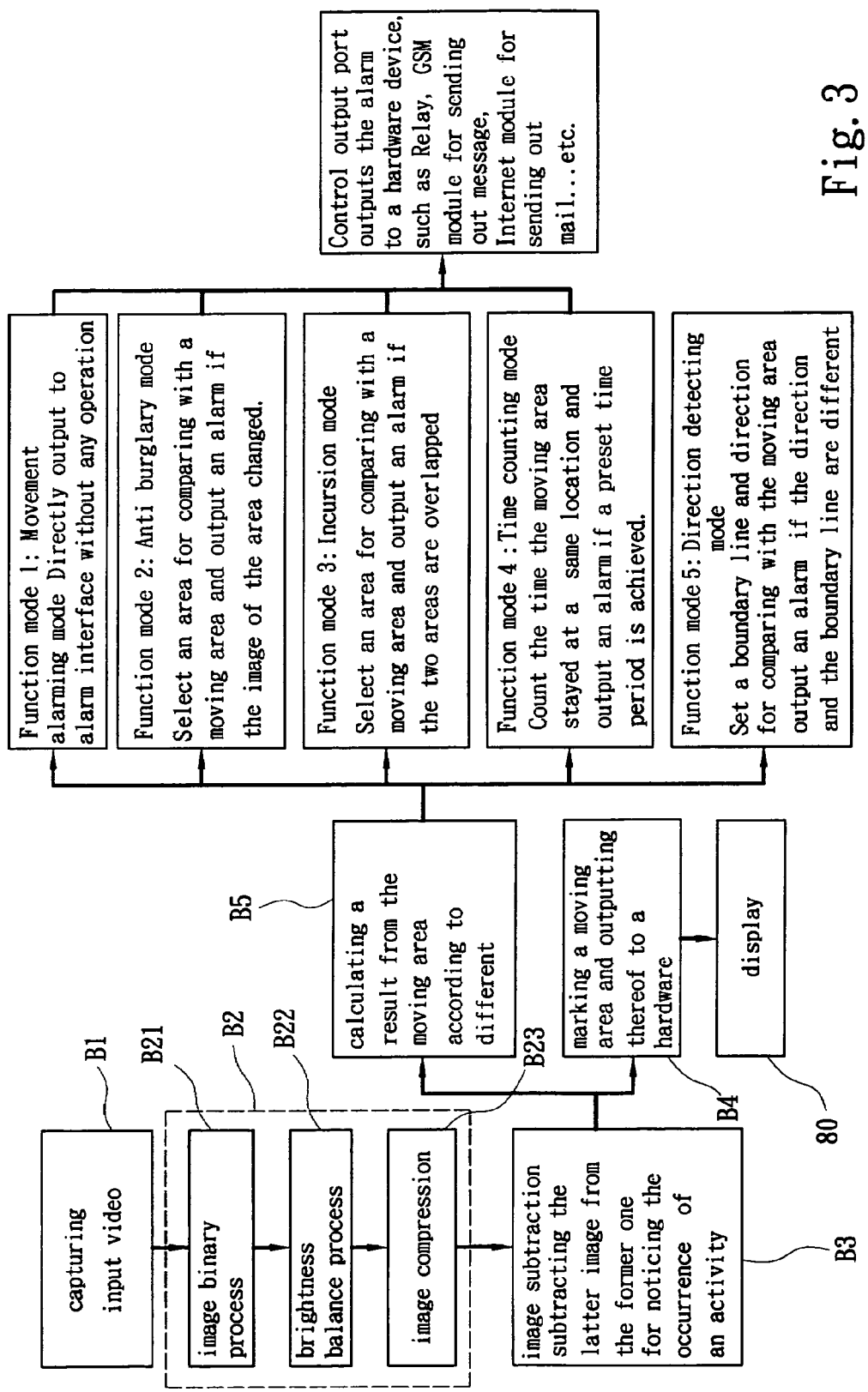
FIG. 3 is a flowing chart of an example of the present invention.

FIG. 3 is a detailed flowing chart of a preferred embodiment, including steps of:

B1. capturing input video and converting thereof into a digital image;

B3. detecting the activity of the image and utilizing, for example, image differencing operation for executing a subtraction of two adjacent images (subtract the latter from the former) so as to notice the occurrence of an activity;

B4. marking a moving area and outputting thereof to a hardware (such as a display 80); and B5. executing a program corresponding to the function mode selected by the user or triggering a corresponding event for outputting a corresponding signal to the control output port 50 so as to control the operation of an external device and/or send out a message to inform the user.

Of course, if needed, an image process can be further executed to the captured image (as shown in step B2: (B21) image binary process; (B22) brightness balance process; and (B23) image compression).

According to the preferred embodiment in the present invention, an image identifying program is further included, wherein the user can previously determine a monitoring range shown in the monitored picture through an input device (such as mouse), and any object moving into this range can be captured and the captured image will be identified in character or appearance. This can be applied to the purposes as followed.

(1) Vehicle license number identification. When a car passes through the predetermined monitoring range, an image identifying software such as OCR can be utilized to analyze the license number. This function can be applied to the management of a parking area, for example. The user may preload some permitted license numbers (which can be stored in memory unit 30) and the license number of any car entering the parking area will be captured for comparing with the preload number. If matched, the main processor 20 may output a command or trigger signal through the control output port 50 for controlling a gate and a driving device thereof which are connected with the control output port 50 or for starting/closing the ON/OFF of the gate so as to control the opening or closing of the gate.

(2) Human face identification. The user may previously store the face image of a target into the memory unit so that when the target passes through the predetermined monitoring range, the captured face image and the face image of the target will process a comparison. If matched, the main processor 20 will output a command or trigger signal through the control output port 50 for controlling the external device which is connected with the control output port 50 to act, such as alarming.

Figure 4:
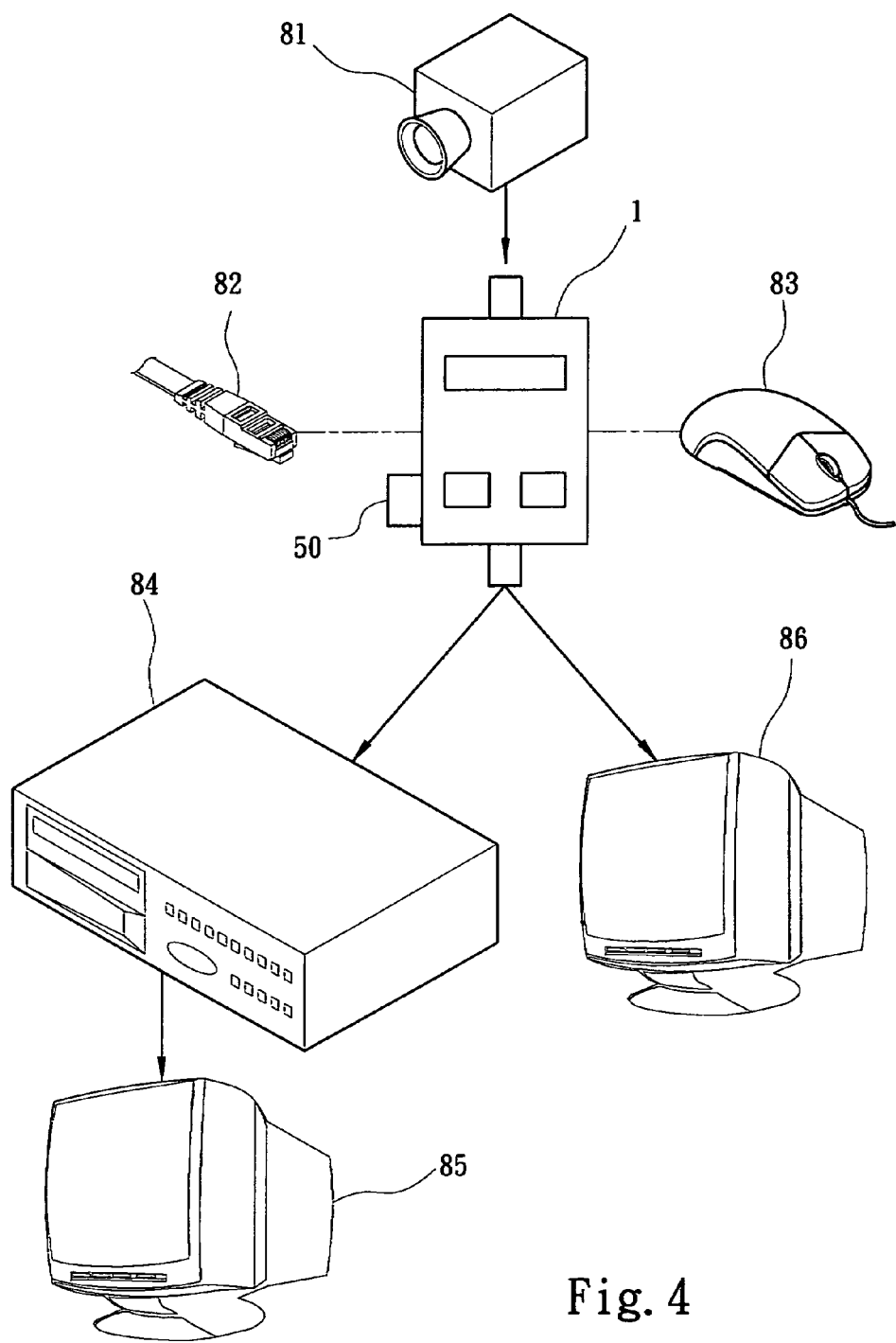
FIG. 4 shows the connection between the device of the present invention and other external devices in a preferred embodiment.

In a preferred way, the present invention is integrated into a box 1 for facilitating carrying. As shown in FIG. 4, the box can be connected with a monitoring camera 81 (or IP camera, Image sensor, for example, CCD or the likes, or other monitoring or playing devices), network cable 82, mouse 83, DVR 84, monitor 85 or displayer 86, and according to different demands, the control output port 50 can be further connected to, for example, speaker, light illuminating element or On/OFF element so as to send out an audio/optical alarm or control other external devices to act through the On/OFF element.

Figure 5A:
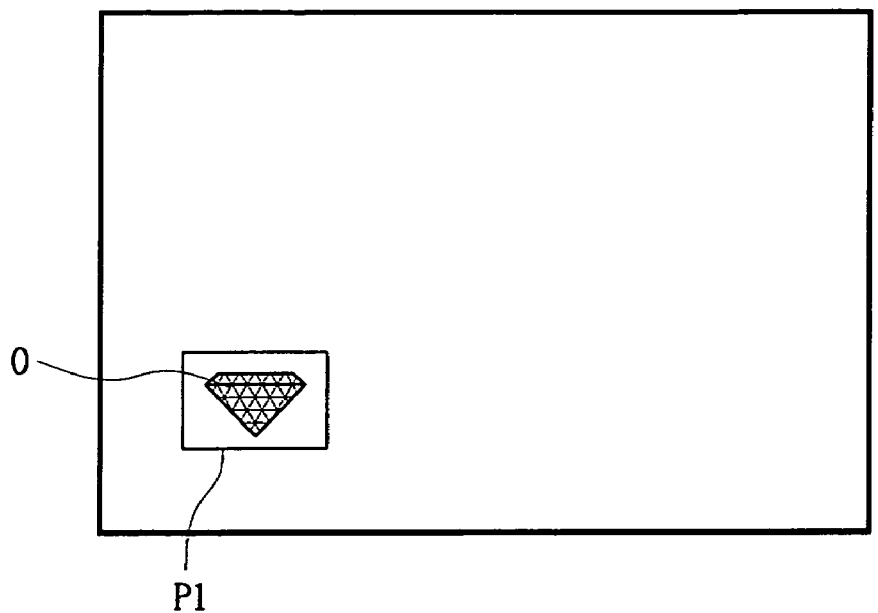
FIGS. 5A and 5B show an example of the device of the present invention applied to an anti burglary mode.
Figure 5B:
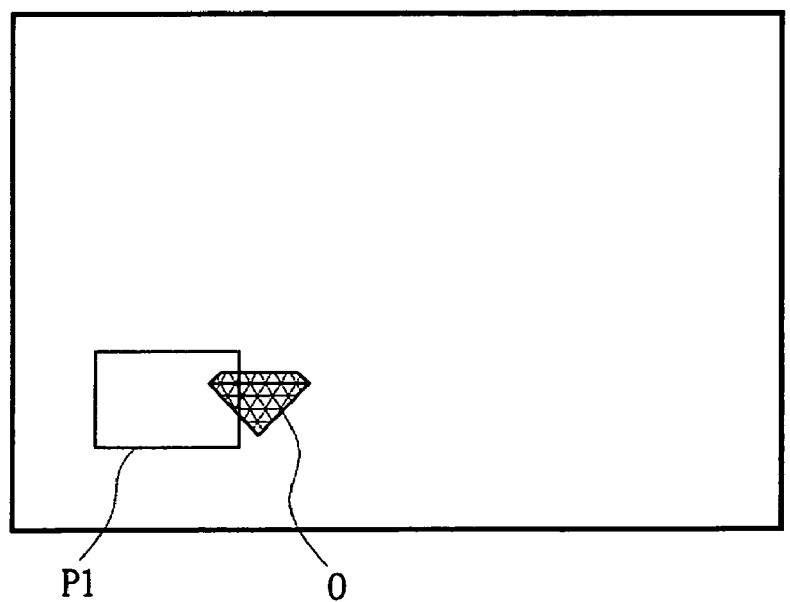

Please further refer to FIG. 5A. An "anti-burglary mode" is disclosed. First, the user utilizes an input device (such as mouse) to mark a preset monitoring area P1 in the monitored picture. For example, if the user wants to know that an object O in the monitored picture is stolen or not, the user may mark a preset monitoring area at the area or location the object O is located, and once the object O is moved or taken away (as shown in FIG. 5B), an image change in the preset monitoring area P1 can be found through the described movement detection (such as image subtraction) so that the main processor 20 may output a signal to the control output port 50 for alarming.

Figure 6A:
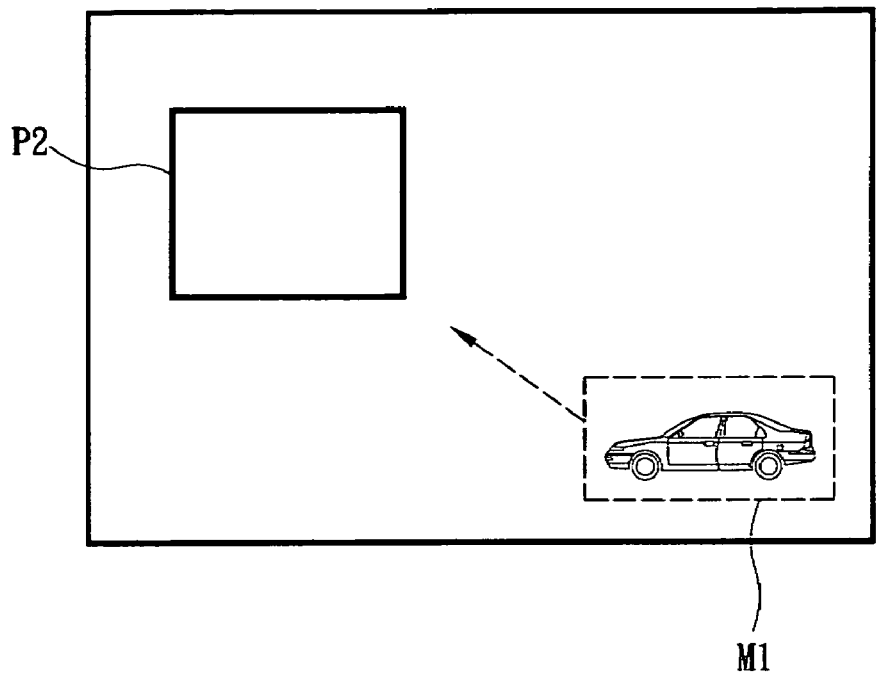
FIGS. 6A and 6B show an example of the device of the present invention applied to an incursion mode.
Figure 6B:
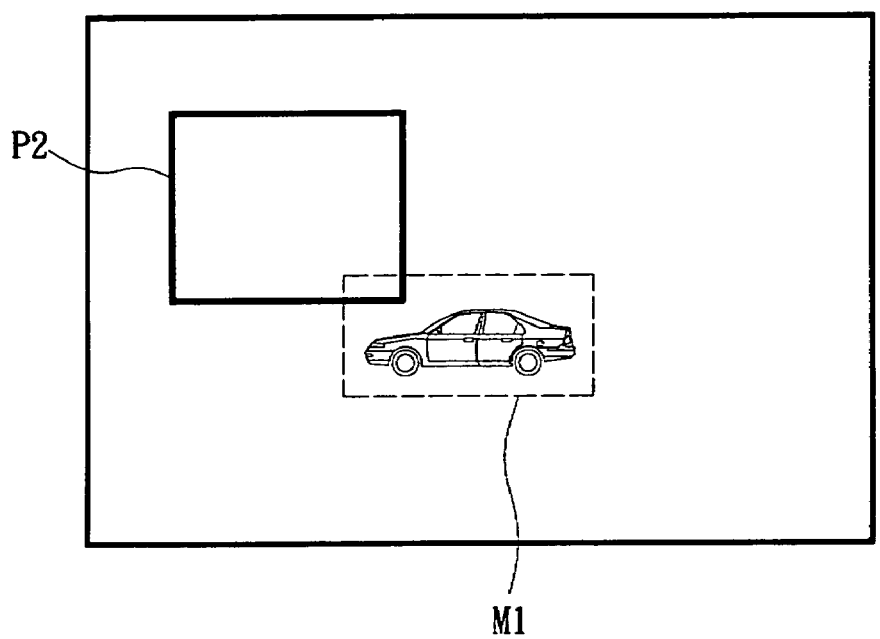

Please further refer to FIG. 6A. An "incursion mode" is disclosed. First, the user utilizes an input device (such as mouse) to mark a preset monitoring area P2 in the monitored picture. When there is an activity found in the monitored picture, a dynamic mark (such as a square M1) will be used in the monitored picture to mark the moving object, and once the mark M1 is contact or overlapped with the preset monitoring area P2 (as shown in FIG. 6B), it means the preset monitoring area P2 is invaded. At this time, the main processor 20 outputs a signal to the control output port 50 for alarming.

Figure 7A:
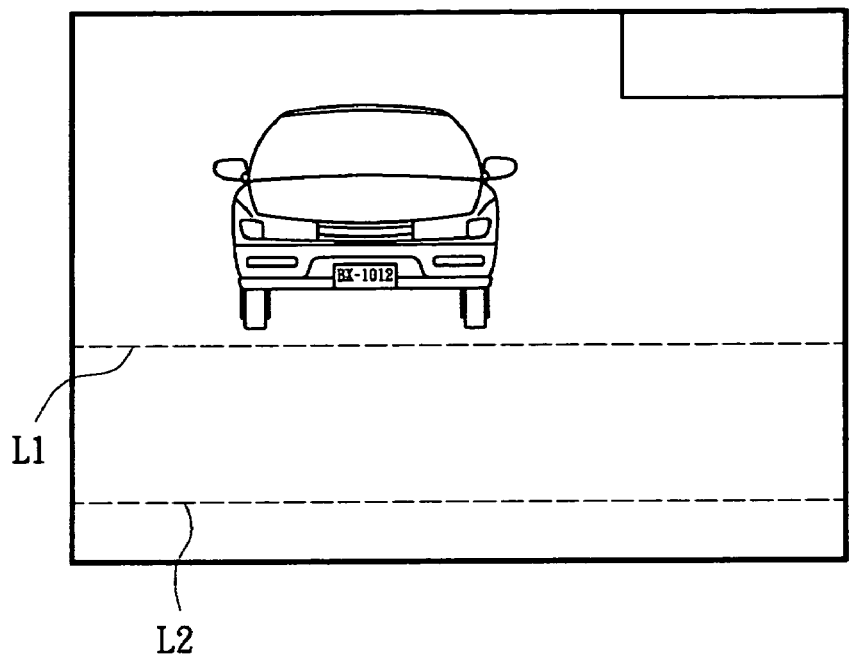
FIGS. 7A and 7B show an example of the device of the present invention applied to identify vehicle license number.
Figure 7B:
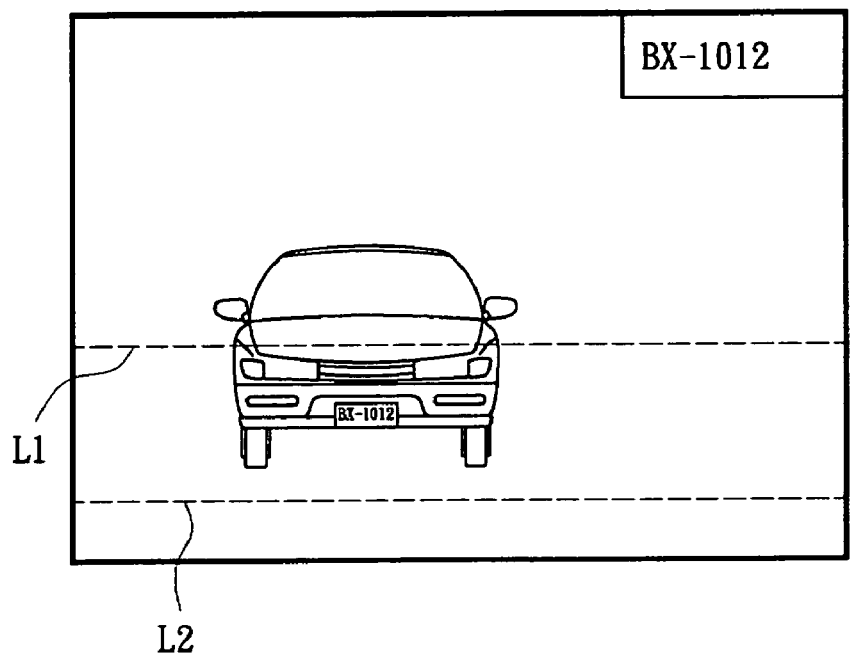

Please further refer to FIG. 7A which shows an example of the device in the present invention being applied to manage a parking area. First, the user utilizes an input device (such as mouse) to mark an identification area between a first boundary L1 and a second boundary L2 in the monitored picture. Once there is a vehicle C entering this identification area (as shown in FIG. 7B), the license number thereof can be identified through moving detection and image identification (such as OCR). If the license number is matched with the pre-stored data, the main processor 20 outputs a command or trigger signal through the control output port 50 for controlling the gate and the driving device thereof which are connected with the control output port 50 or for starting/closing the ON/OFF of the gate so as to control the opening or closing of the gate.

Identically, the remainder function modes are also operated in a similar way. The user may previously set a monitoring area or object in the monitored picture, and through image monitoring and detection of the present invention, the moving object may be marked automatically. Then, the target is monitored through comparing the activity of certain target and/or identifying image contents, and further, as the activity of the target and/or the identified image contents triggers certain preset event, it will control an external device to act and/or output a message to notify the user.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable image monitoring and identifying device in a single box, comprising:
    an image input unit having an image input terminal capable of connecting with an external video source as an only signal input to said box for converting a captured image signal into a visual digital signal and outputting thereof;
    a main processor for processing the visual digital signal outputted by the image input unit, wherein the main processor comprises different programs for being executed respectively according to a selected function mode so as to send out a command or trigger signal when an activity of at least one of the image and an identified image content triggers a preset event;
    a memory unit for storing image data produced by the main processor;
    an input port for connecting with an input device so as to support a necessary operation by the user; and
    a control output port for outputting the command or trigger signal from the main processor so as to control the operation of other external devices, which are connected to the control output port, and send out a message to notify the user.

2. The device as claimed in claim 1, wherein the function mode executed by the program comprises a movement alarming mode, in which, through monitoring the image, once an activity is found, a signal is immediately outputted to the control output port so as to send out an audio/optical alarm.

3. The device as claimed in claim 1, wherein the function mode executed by the program comprises an anti burglary mode, in which a preset monitoring area in the image is monitored so that when the image of the monitored area has any change, a signal is outputted to the control output port so as to send out an alarm.

4. The device as claimed in claim 1, wherein the function mode executed by the program comprises an incursion mode, in which a moving area and a preset monitoring area are monitored so that when the two areas are overlapped or contacted, a signal is outputted to the control output port so as to send out an alarm.

5. The device as claimed in claim 1, wherein the function mode executed by the program comprises a time counting mode, in which the time the moving area stayed at a same location is counted and if a preset time period is achieved, a signal is outputted to the control output port so as to send out an alarm.

6. The device as claimed in claim 1, wherein the function mode executed by the program comprises a direction detecting mode, in which a preset moving direction is set and compared with a moving direction of a moving area, and if the two moving directions are different, a signal is outputted to the control output port for sending out an alarm.

7. The device as claimed in claim 1, further comprising an image identification program for performing a character or appearance identification on the content of the image.

8. The device as claimed in claim 7, wherein the function mode executed by the program comprises a vehicle license number identification for analyzing a license number of a vehicle and comparing the identified license number with a preload license number so as to, if matched, output a command or trigger signal for controlling a gate and a driving device thereof, or to start/close the ON/OFF of the gate for controlling the opening or closing of the gate.

9. The device as claimed in claim 1, wherein the function mode executed by the program comprises a human face identification, in which the user previously stores a face image of a target into the memory unit so that when the target passes through the predetermined monitoring range, a captured face image and the face image of the target are processed a comparison through an image software, and, as matched, a command or trigger signal is outputted for controlling the external devices which are connected with the control output port to act.

10. The device as claimed in claim 1, further comprising a digital image output terminal and/or analog image output terminal for adding an user-interface signal into the processed and monitored digital and/or analog image signal and then outputting thereof to the external devices.

11. The device as claimed in claim 1, further comprising a storage apparatus for storing monitored pictures or recording a procedure of event.

12. The device as claimed in claim 11, wherein the storage apparatus is a disc drive, a DVR (Digital Video Recorder) or the likes.

13. The device as claimed in claim 1, further comprising a communication unit having a wireless communication module adopting standard protocol, a wired communication module or the combination thereof.

14. The device as claimed in claim 13, wherein the wireless communication module is capable of adopting various kinds of protocols, including one of 433 MHz module, Z-Wave, Zigbee, GSM, and X-10.

15. The device as claimed in claim 13, wherein the wired communication module is an Ethernet module.

16. The device as claimed in claim 13, wherein the communication unit transmits a control signal or control command from the user to the main processor for executing an indication from the user through the main processor so as to achieve a remote control.

17. The device as claimed in claim 1, wherein the memory unit is a random access memory (RAM).

18. The device as claimed in claim 1, wherein the input device is a mouse.

19. The device as claimed in claim 1, wherein the main processor contains a movement alarming mode, an anti burglary mode, an incursion mode, a time counting mode, a direction detecting mode, a vehicle license identification mode and a human face identification mode as function modes.

* * * * *